United States Patent
Dahlman et al.

(10) Patent No.: US 9,883,463 B2
(45) Date of Patent: Jan. 30, 2018

(54) USER EQUIPMENT, A NETWORK NODE AND METHODS FOR DEVICE DISCOVERY IN A DEVICE-TO-DEVICE (D2D) COMMUNICATION IN A WIRELESS TELECOMMUNICATIONS NETWORK

(71) Applicant: Telefonaktiebolaget L M Ericsson (Publ), Stockholm (SE)

(72) Inventors: Erik Dahlman, Stockholm (SE); Stefan Parkvall, Bromma (SE); Gabor Fodor, Hässelby (SE); Leif Wilhelmsson, Dalby (SE); Göran N. Klang, Enskede (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 377 days.

(21) Appl. No.: 14/427,044

(22) PCT Filed: Oct. 1, 2012

(86) PCT No.: PCT/SE2012/051047
§ 371 (c)(1),
(2) Date: Mar. 10, 2015

(87) PCT Pub. No.: WO2014/054984
PCT Pub. Date: Apr. 10, 2014

(65) Prior Publication Data
US 2015/0245301 A1   Aug. 27, 2015

(51) Int. Cl.
*H04W 24/00* (2009.01)
*H04W 52/24* (2009.01)
(Continued)

(52) U.S. Cl.
CPC ......... *H04W 52/243* (2013.01); *H04W 8/005* (2013.01); *H04W 48/12* (2013.01);
(Continued)

(58) Field of Classification Search
CPC .................................................. H04W 64/003
(Continued)

(56) References Cited

U.S. PATENT DOCUMENTS

2009/0280828 A1* 11/2009 Wang .................. H04W 64/003
455/456.1
2010/0110999 A1   5/2010 Li et al.
(Continued)

FOREIGN PATENT DOCUMENTS

WO   WO 2009/009453 A2   1/2009

OTHER PUBLICATIONS

International Search Report, International Application No. PCT/SE2012/051047 dated Jun. 21, 2013, 5 pp.
(Continued)

*Primary Examiner* — Thomas Lett
(74) *Attorney, Agent, or Firm* — Sage Patent Group

(57) ABSTRACT

A first user equipment transmits a beacon signal to be detected by at least one second user equipment for Device-to-Device, D2D, communication in a wireless telecommunications network. The first user equipment transmits the beacon signal in transmission bursts with a first energy level, where the transmission bursts are transmitted continually over time in order to enable detection of the beacon signal by the at least one second user equipment. The first user equipment then increases the energy of the transmission bursts at one or more intervals to a second energy level such that transmission bursts with the first energy level is alternated with transmission bursts with the second energy level, and such that transmission bursts with the first energy level recur more frequently over time than transmission bursts with a second energy level. A user equipment, a network node and a method in the network node are also provided.

15 Claims, 7 Drawing Sheets

(51) Int. Cl.
*H04W 8/00* (2009.01)
*H04W 52/32* (2009.01)
*H04W 52/36* (2009.01)
*H04W 52/38* (2009.01)
*H04W 52/50* (2009.01)
*H04W 48/12* (2009.01)
*H04W 52/28* (2009.01)
*H04W 88/06* (2009.01)
*H04W 88/10* (2009.01)

(52) U.S. Cl.
CPC ......... *H04W 52/288* (2013.01); *H04W 52/32* (2013.01); *H04W 52/36* (2013.01); *H04W 52/383* (2013.01); *H04W 52/386* (2013.01); *H04W 52/50* (2013.01); *H04W 88/06* (2013.01); *H04W 88/10* (2013.01)

(58) Field of Classification Search
USPC ....................................... 455/426.1; 370/336
See application file for complete search history.

(56) References Cited

U.S. PATENT DOCUMENTS

2011/0051697 A1 3/2011 Wang et al.
2012/0149422 A1 6/2012 Ye et al.

OTHER PUBLICATIONS

Written Opinion of the International Searching Authority, International Application No. PCT/SE2012/051047 dated Jun. 21, 2013, 7 pp.

Kim et al: "A prioritized random access with discriminative power ramping step size" Vehicular Technology Conference, 2000. IEEE VTS FALL VTC 2000. $52^{nd}$ Sep. 24-28, 2000, Piscataway, NJ, vol. 4, Sep. 24, 2000. pp. 1751-1757, XP010524331.

* cited by examiner

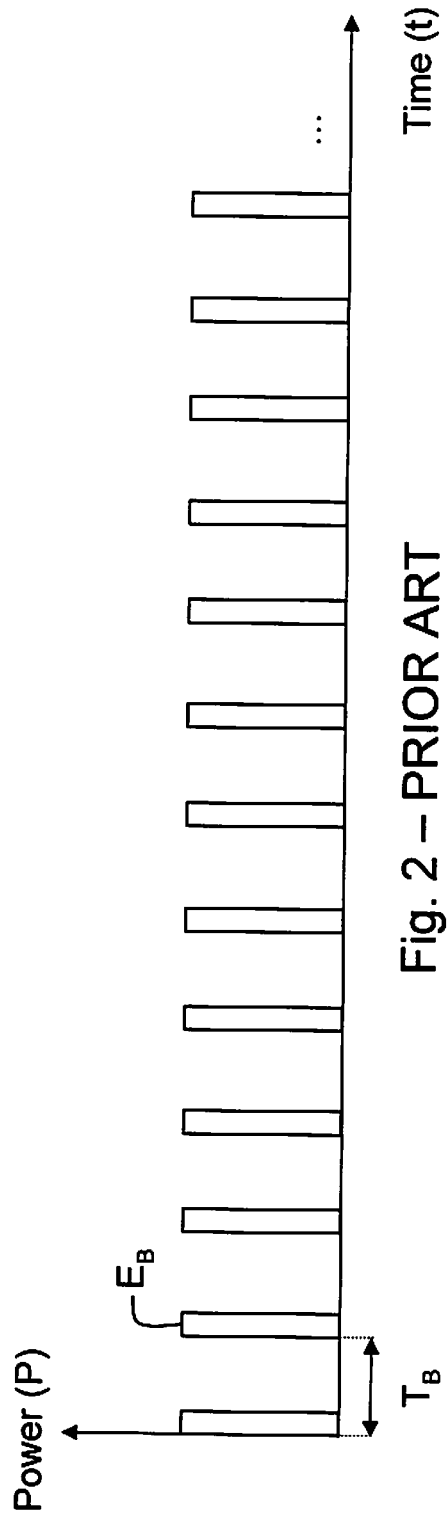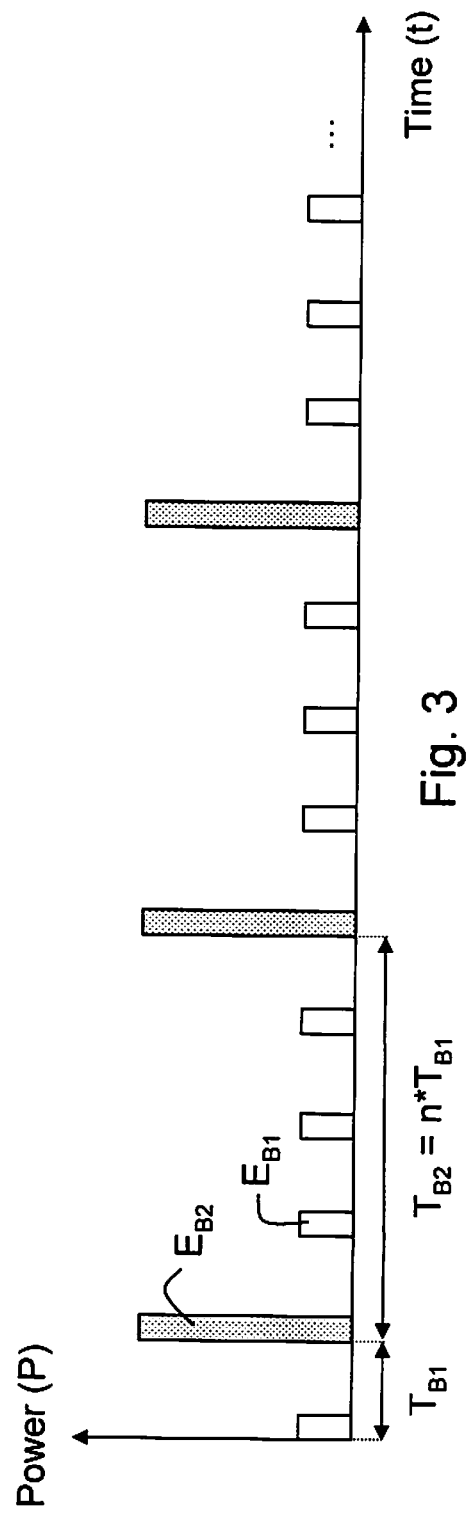

USER EQUIPMENT, A NETWORK NODE AND METHODS FOR DEVICE DISCOVERY IN A DEVICE-TO-DEVICE (D2D) COMMUNICATION IN A WIRELESS TELECOMMUNICATIONS NETWORK

CROSS REFERENCE TO RELATED APPLICATION

This application is a 35 U.S.C. § 371 national stage application of PCT International Application No. PCT/SE2012/051047, filed on 1 Oct. 2012, the disclosure and content of which is incorporated by reference herein in its entirety. The above-referenced PCT International Application was published in the English language as International Publication No. WO 2014/054984 A1 on 10 Apr. 2014.

TECHNICAL FIELD

Embodiments herein relate to Device-to-Device (D2D) communications in a wireless telecommunications network. In particular, embodiments herein relate to device discovery in a D2D-communication in a wireless telecommunications network.

BACKGROUND

Communication devices such as User Equipments (UE) are also known as e.g. mobile terminals, wireless terminals and/or mobile stations. User equipments are enabled to communicate wirelessly in a wireless communications system or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the wireless communications system.

User equipments may further be referred to as mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is a geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP GSM EDGE Radio Access Network (GERAN), a user equipment has a multi-slot class, which determines the maximum transfer rate in the uplink and downlink direction. EDGE is an abbreviation for Enhanced Data rates for GSM Evolution.

In the context of this disclosure, the expression Downlink (DL) is used for the transmission path from the base station to the mobile station. The expression Uplink (UL) is used for the transmission path in the opposite direction i.e. from the mobile station to the base station.

In D2D communications user equipments that are in the proximity of each other may discover one another. This is referred to as D2D device discovery. In D2D device discovery user equipments may receive a beacon signal from another user equipment and discover that it is in the proximity of the another user equipment. This may be performed without any direct interaction by the radio access network.

However, there may very well be an indirect radio access network involvement, such as, e.g. the network may inform a first user equipment how to transmit the beacon signal and/or inform a second user equipment about how the beacon signal is transmitted, which would simplify the detection of the beacon signal by the second user equipment. In this type of network assisted D2D device discovery, the radio access network may e.g. allocate resources for the beacon signal so that transmitting and receiving user equipments know what time and frequency resources are being used for D2D device discovery. In other words, when and at what frequencies the beacon signal should be transmitted and scanned for or received at.

It should be noted that the beacon signal transmitted by the first user equipment is typically not only intended for the second user equipment. Multiple user equipments may detect the beacon signal and thus conclude whether or not they are in the proximity of the first user equipment.

Once the user equipments discover the proximity of each other through D2D discovery, the user equipments and/or the network may initiate the establishment of the D2D link between the two user equipments. This is commonly referred to as D2D bearer establishment and is not described in any further detail hereinafter.

The beacon signal from the user equipments are commonly transmitted in a transmission bursts of a certain power and with a relatively short duration e.g. in the range of microseconds (μs). In order to facilitate proximity detection in D2D device discovery, the transmission bursts are transmitted continually with a certain transmission interval.

FIG. 2 shows an example of a conventional beacon signaling according to the prior art in a wireless communication system 100 as shown in FIG. 1.

It can be shown that the energy $E_B$ and transmission interval $T_B$ of the transmission bursts of the beacon signal determines the range and latency of the proximity detection in D2D device discovery.

However, since beacon signals from user equipments may be take place in an operator licensed spectrum that is used for ordinary cellular communications, the beacon signals may cause interference for the ordinary cellular communications.

SUMMARY

It is an object of embodiments herein to improve trade-off between the performance of the proximity detection and the caused interference in D2D device discovery in a wireless communications network.

According to a first aspect of embodiments herein, the object is achieved by a method in a first user equipment for transmitting a beacon signal to be detected by at least one second user equipment for Device-to-Device, D2D, communication in a wireless telecommunications network. The first user equipment transmits the beacon signal in transmission bursts with a first energy level, wherein the transmission bursts are transmitted continually over time in order to enable detection of the beacon signal by the at least one second user equipment. The first user equipment then increases the energy of the transmission bursts at one or more intervals to a second energy level such that transmission bursts with the first energy level is alternated with transmission bursts with the second energy level, and such that transmission bursts with the first energy level recur more frequently over time than transmission bursts with a second energy level.

According to a second aspect of embodiments herein, the object is achieved by a first user equipment for transmitting a beacon signal to be detected by at least one second user equipment for Device-to-Device, D2D, communication in a wireless telecommunications network. The first user equipment is configured to transmit the beacon signal in transmission bursts with a first energy level, wherein the transmission bursts are transmitted continually over time in order to enable detection of the beacon signal by the at least one second user equipment. Also, the first user equipment comprises a processing unit configured to increase the energy of the transmission bursts at one or more intervals to a second energy level such that transmission bursts with the first energy level is alternated with transmission bursts with the second energy level, and such that transmission bursts with the first energy level recur more frequently over time than transmission bursts with a second energy level.

According to a third aspect of embodiments herein, the object is achieved by a method in network node for configuring a beacon signal in a first user equipment for D2D communication in a wireless telecommunications network. The first user equipment is configured to transmit the beacon signal to be detected by at least one second user equipment. The beacon signal is transmitted in transmission bursts with a first energy level, wherein the transmission bursts are transmitted continually over time in order to enable detection of the beacon signal by the at least one second user equipment. The network node determines one or more intervals at which the first user equipment is to increase the energy of the transmission bursts to a second energy level such that transmission bursts with the first energy level is alternated with transmission bursts with the second energy level, and such that transmission bursts with the first energy level recur more frequently over time than transmission bursts with a second energy level. Then, the network node transmits information indicating the determined one or more intervals at which the energy of the transmission bursts should be increased to the second energy level, to the first user equipment to enable D2D communication.

According to a fourth aspect of embodiments herein, the object is achieved by a network node for configuring a beacon signal in a first user equipment for D2D communication in a wireless telecommunications network. The first user equipment is configured to transmit the beacon signal to be detected by at least one second user equipment. The beacon signal is transmitted in transmission bursts with a first energy level, wherein the transmission bursts are transmitted continually over time in order to enable detection of the beacon signal by the at least one second user equipment. The network node comprises a determining unit configured to determine one or more intervals at which the first user equipment is to increase the energy of the transmission bursts to a second energy level such that transmission bursts with the first energy level is alternated with transmission bursts with the second energy level, and such that transmission bursts with the first energy level recur more frequently over time than transmission bursts with a second energy level. Also, the network node comprises a transceiving unit configured to transmit information indicating the determined one or more intervals at which the energy of the transmission bursts should be increased to the second energy level, to the first user equipment to enable D2D communication.

By increasing the energy of the transmission burst of a beacon signal continually at certain points in time as described above, user equipments that are close to each other may detect their proximity with low latency, while user equipment further away from each other also still may detect their proximity albeit with potentially higher latency. Because of the lower on-average energy usage in the transmission bursts, the interference created by beacon signalling with a certain proximity detection range in the wireless communication network may be reduced.

Thus, the trade-off between the performance of the proximity detection, e.g. in terms of latency and range of the proximity detection, and the caused interference in D2D device discovery in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 2 is a schematic signalling diagram depicting beacon signalling according to prior art, FIG. 3 is a schematic signalling diagram depicting beacon signalling according to some exemplary embodiments.

DETAILED DESCRIPTION

Figure 1:
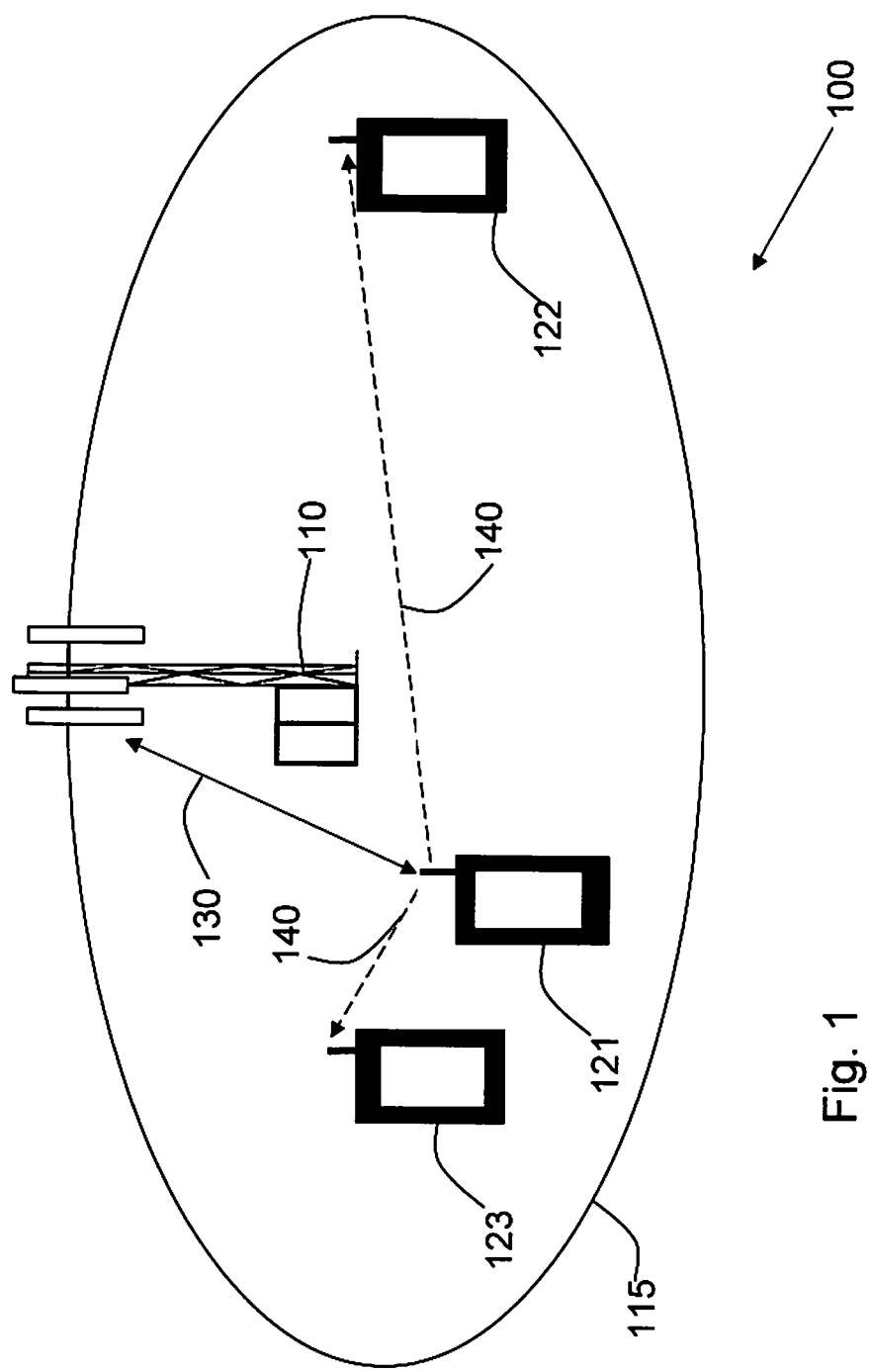
FIG. 1 is a schematic block diagram illustrating embodiments in a wireless communications network.

The figures are schematic and simplified for clarity, and they merely show details which are essential to the understanding of the embodiments presented herein, while other details have been left out. Throughout, the same reference numerals are used for identical or corresponding parts or steps.

According to embodiments herein, a new type of beacon transmission in a user equipment is introduced that increases the energy of the transmission burst of a beacon signal continually at certain points in time. Herein, the term "continually" is intended to mean that the transmission bursts are transmitted repeatedly in time, with breaks in between. It should also be noted that for the purpose of the embodiments described herein the term "D2D communication" may refer to D2D device discovery, D2D bearer establishment and/or the actual data transfer over an established D2D link.

FIG. 1 depicts a communications network 100 in which embodiments herein may be implemented. In some embodiments the communications network 100 may be a wireless communication network such as an LTE (e.g. LTE FDD, LTE TDD, LTE HD-FDD), LTE-Advanced (LTE-A), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or any cellular network or system.

A number of user equipments are located in the communications network 100. The user equipments may also be referred to as wireless devices. In the example scenario of FIG. 1, only three user equipments are shown. One of them is a first user equipment 121. Further, one or more second user equipments 122, 123 are located in the cellular communications network 100, whereof two second user equipments 122, 123 are shown in FIG. 1.

The first user equipment 121 and the two second user equipments 122, 123 may be located in a cell 115 served by the network node 110. The network node 110 may be referred to as a base station. The network nodes 110 may e.g. be an eNB, an eNodeB, or a Home Node B, a Home eNode B, a femto Base Station (BS), a pico BS or any other network unit capable to serve a user equipment or a machine type communication device which are located in the cell 115 in the wireless telecommunications network 100. The network node 110 may also be connected to a core network node (not shown) in the wireless communications network 100.

The first user equipment 121 and the two second user equipments 122, 123 are both capable to communicate using D2D communication and/or via ordinary cellular communication signaling 130. The first user equipment 121 may e.g. communicate with one or more of the two second user equipments 122, 123 using D2D communication over a D2D link.

The first user equipment 121 and the two second user equipments 122, 123 may e.g. be mobile terminals or wireless terminals, mobile phones, computers such as e.g. laptops, Personal Digital Assistants (PDAs) or tablet computers, sometimes referred to as surf plates, with wireless capability, Machine to Machine (M2M) devices or any other radio network units capable to communicate over a radio link in a communications network.

In D2D communication user equipments need to find each other in order to be able to communicate. This can be done either with network support, e.g. via network signaling 130, or purely based on communications between the user equipments as exemplified in some of the embodiments herein.

User equipments such as the first user equipment 121 and the two second user equipments 122, 123 in FIG. 1, attempt to discover user equipments in a local range for e.g. communication or that can provide a given type of service. The first user equipment 121 may make use of some D2D technology and broadcasts a beacon signal 140 over a beacon channel, which may be received by a peer such as one or more of the second user equipments 122, 123, thereby enabling D2D device discovery. There may be multiple D2D technologies in operation which may carry a beacon signal 140. Possible options comprise 802.11 WLAN, Bluetooth, or a possible future D2D extension of LTE, or other technologies, such as, wireless sensor technology.

As part of the developing of the embodiments described herein, a problem will first be identified and discussed.

The range of the proximity detection in D2D device discovery determines how far from the user equipment 121 its beacon signal 140 may be detected by another user equipment 122, 123. The range of the proximity detection is primarily given by the energy of the transmission burst of the beacon signal 140, i.e. higher energy gives longer range. The energy of a transmission burst is given by the transmission power used in the transmission burst and the length of the transmission burst.

The latency of the proximity detection in D2D device discovery determines how quickly the another user equipment 122, 123 may detect that it is in the proximity of user equipment 121. The latency of the proximity detection is primarily given by the repetition period of the transmission bursts of the beacon signal 140, i.e. faster on-average detection is achieved with shorter repetition period. However, the latency may also be affected by the length of the transmission burst.

The interference caused by a beacon transmission with a particular range and latency of the proximity detection in D2D device discovery is given by the energy of each transmission burst and the repetition period of the transmission burst, i.e. the higher the energy and/or the shorter the repetition period the more interference is caused by the beacon transmission enabling proximity detection.

Hence, typically, in order to increase the range and/or decrease the latency of the proximity detection in D2D device discovery, the energy of the transmission bursts of the beacon signal 140 must be increased, e.g. by increasing the power and/or length of the burst, or the repetition period of the transmission bursts of the beacon signal 140 must be decreased.

However, as shown above, increasing the energy of the transmission bursts of the beacon signal 140 will cause an increase in the interference caused by the beacon transmission enabling the proximity detection in the wireless communication network 100. This interference may be particularly sensitive in case the transmission bursts of the beacon signal 140 takes place in an operator licensed spectrum that is used for ordinary cellular communications in the wireless communication network 100.

Therefore, a need has been identified for a more flexible and improved trade-off for the beacon signalling in D2D device discovery in terms of the range and latency of the proximity detection and caused interference by the beacon transmission enabling the proximity detection.

This is solved, according to the embodiments presented herein, by increasing the energy of the transmission burst of a beacon signal 140 continually at certain points in time, e.g. at one or more intervals. This is exemplified in and explained below in reference to FIGS. 3-4.

FIG. 3 shows the beacon signal 140 of the first user equipment 121 that is transmitted in transmission bursts with a first energy level $E_{B1}$. The transmission bursts are transmitted continually over time with a repetition period $T_{B1}$.

However, at every n:th transmission burst where n=2, 3, 4, 5 . . . , N, the energy of the transmission burst is increased to a second energy level $E_{B2}$. N may here be any suitable integer. Thus, n determines the interval at which the transmission burst is increased to a second energy level $E_{B2}$. This means that transmission bursts with the first energy level $E_{B1}$ is alternated with transmission bursts with the second energy level $E_{B2}$, such that transmission bursts with the first energy level $E_{B1}$ recur more frequently over time than transmission bursts with a second energy level $E_{B2}$.

Figure 4:
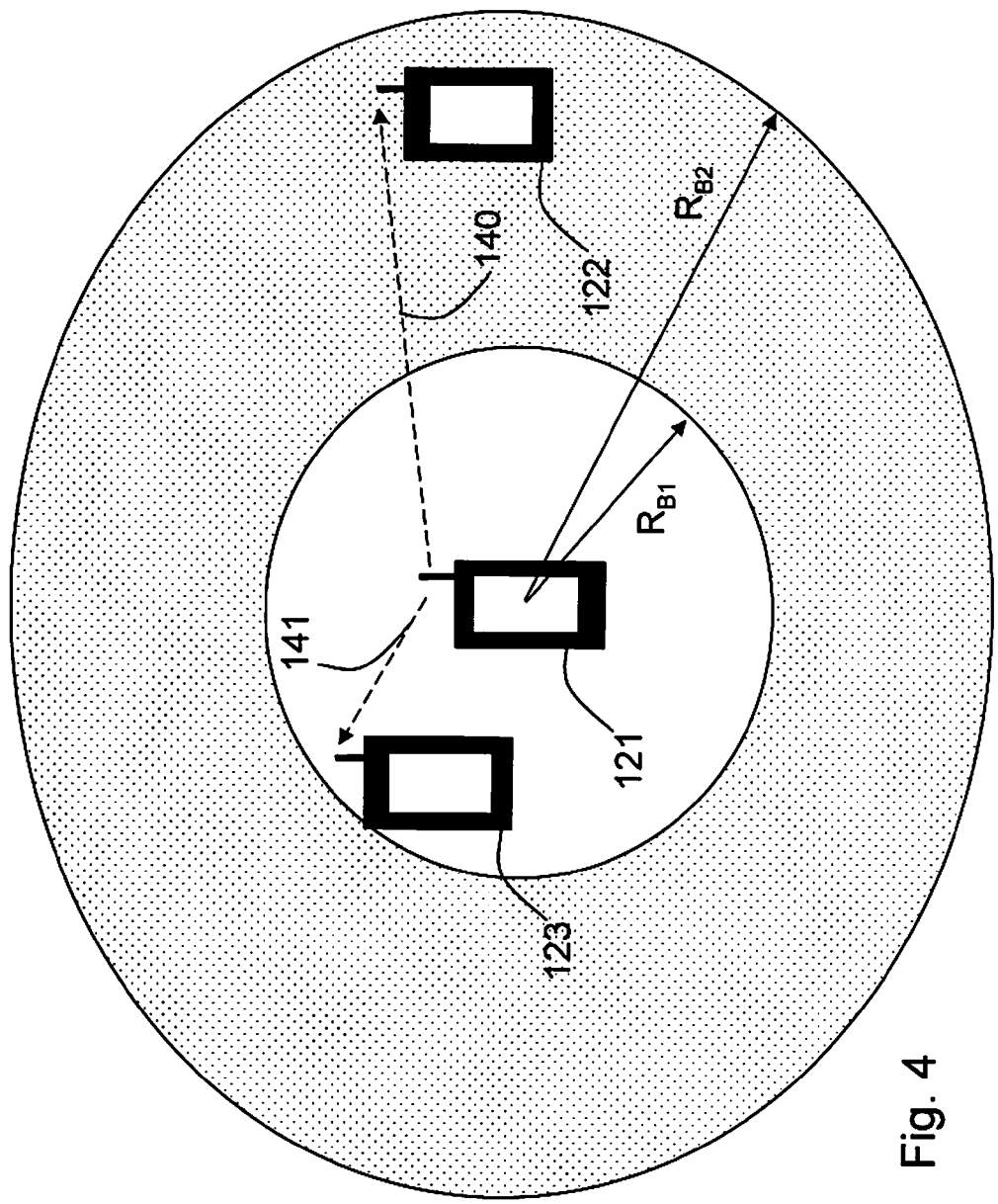
FIG. 4 is a schematic block diagram illustrating beacon signalling according to some exemplary embodiments.

In the scenario depicted in FIG. 4, this means that user equipments close to the first user equipment 121, i.e. the second user equipment 123 within range $R_{B1}$, can detect the beacon signal 140 with low latency (given by $T_{B1}$), while user equipments further away from the first user equipment 121, i.e. the second user equipment 122 within range $R_{B2}$, can still detect the beacon signal 140 although with potentially a higher latency (given by $T_{B2}$).

Because of the lower on-average energy usage in the transmission bursts, as compared to e.g. the beacon signalling in FIG. 2, the interference created by the beacon signalling in FIG. 3 is reduced. Hence, a more flexible and improved trade-off for the beacon signalling in D2D device discovery in terms of the range and latency of the proximity detection and caused interference is achieved.

More detailed embodiments showing how this may be performed are described below with reference to FIGS. 5-8.

Figure 5:
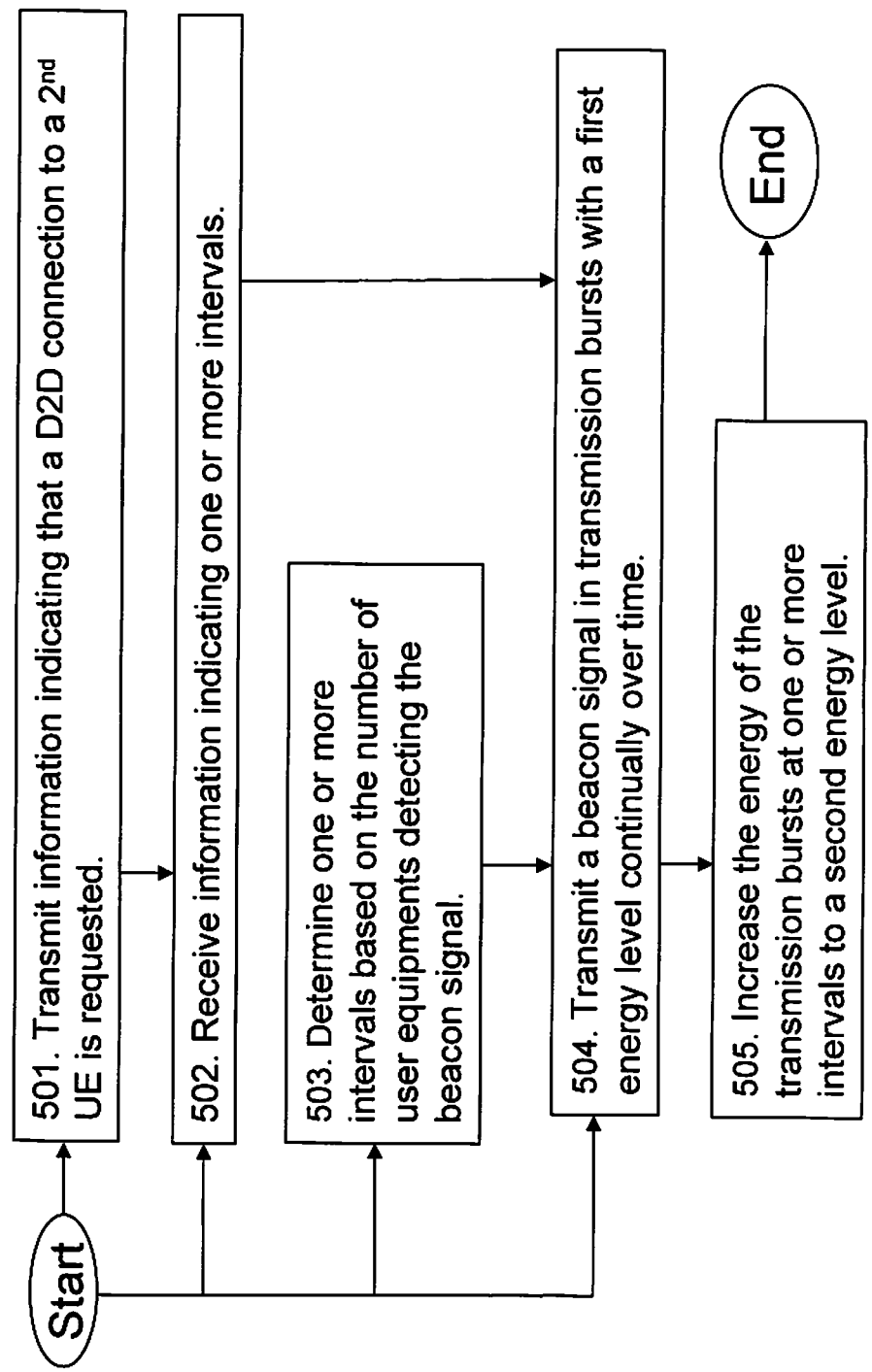
FIG. 5 is a flowchart depicting embodiments of a method in user equipment.

Example of embodiments of a method in a first user equipment 121 for transmitting a beacon signal 140 to be detected by at least one second user equipment 122, 123 for D2D communication in a wireless telecommunications network 100, will now be described with reference to a flowchart depicted in FIG. 5. Here, the method is discussed seen from the perspective of the first user equipment 121. In an example scenario, the first user equipment 121 seeks or wishes to be discovered by a user equipment such as one or more of the second user equipments 122, 123 for D2D communication. Therefore, the first user equipment 121 intend to send the beacon signal 140 that is to be discovered by the one or more of the second user equipments 122, 123 and assist the one or more of the second user equipments 122, 123 to find the first user equipment 121. This may be performed for a determined period of time, i.e. the beacon transmission comprises a starting point in time and an end point in time. This period of time for beacon transmission may be suitably configured in the first user equipment 121, e.g. determined in the first user equipment 121 or by a network node 110. The method may be performed for the entire duration of the beacon transmission or part(s) of the duration of the beacon transmission.

The method may comprise the following actions, which actions may be taken in any suitable order.

Action 501

In some embodiments, when network assisted D2D device discovery is used, the first user equipment 121 may transmit information to a network node 110 in the wireless telecommunications network 100 indicating that a D2D communication to one or more second user equipments 122, 123 is requested. This may be performed by the first user equipment 121 prior to or during transmission of the beacon signal 140. Thus, the network node 110 is informed that the first user equipment 121 desires to establish a D2D communication with one or more second user equipments 122, 123.

Action 502

In some embodiments, when network assisted D2D device discovery is used, the first user equipment 121 may receive information from the network node 110 indicating one or more intervals at which the energy of the transmission bursts of the beacon signal 140 should be increased to the second energy level. This may be performed in response to transmitting the information to the network node 110 in Action 501, or at any time initiated by the network node 110.

Additionally, the first user equipment 121 may also receive information from the network node 110 indicating how the energy should be increased by the first user equipment 121 at the one or more intervals, e.g. in the form of an energy level, power level and/or burst duration. Also, the first equipment 121 may also receive information from the network node 110 indicating the duration of the beacon transmission.

In this way, the network node 110 may inform the first user equipment 121 of suitable one or more intervals at which the energy of the transmission bursts of the beacon signal 140 should be increased to the second energy level.

Action 503

Optionally, in some embodiments, the first user equipment 121 may determine the one or more intervals at which the energy of the transmission bursts should be increased to the second energy level, based on the number of the one or more second user equipments 122, 123 that detects, and consequently responds, to the beacon signal of the first user equipment 121. This may be performed because the significance of the amount of interference caused by the beacon signal 140 may depend on the number of the one or more second user equipments 122, 123 in the proximity of the first user equipment 121.

For example, when there are a lot of user equipments in the proximity of the first user equipment 121, it may be advantageous to either refrain from increasing the energy of the transmission bursts of the beacon signal 140 or to increase the time that lapses between the transmission bursts with an increased energy, i.e. the repetition period; this, so as not to add further interference to an already crowded spectrum. On the other hand, when there are few user equipments in the proximity of the first user equipment 121, it may be advantageous to either increase the energy of the transmission bursts of the beacon signal 140 and/or to decrease the time that lapses between the transmission bursts with an increased energy; this, since the caused interference won't affect that many user equipments.

Action 504

In this action, the first user equipment 121 transmits the beacon signal 140 in transmission bursts with a first energy level. The transmission bursts are transmitted continually over time. This may be performed according to a determined repetition period, such as, a normal or default time period, e.g. $T_{B1}$ in FIG. 3.

This is performed in order to enable detection of the beacon signal 140 by the one or more second user equipments 122, 123.

Action 505

When transmitting the beacon signal 140, the first user equipment 121 increases the energy of the transmission bursts at one or more intervals to a second energy level. This is performed such that the transmission bursts with the first energy level, as described in Action 504, is alternated with transmission bursts with the second energy level. This is also performed such that the transmission bursts with the first energy level recur more frequently over time than transmission bursts with the second energy level. Here, the term "over time" is intended to mean over a determined time period.

For example, this means that number of transmission bursts having an increased amount of energy, i.e. on a second energy level, will be more spread out in time than the transmission bursts with the normal/default amount of energy, i.e. on a first energy level. The one or more intervals at which transmission bursts having an increased amount of energy is to be transmitted may, for example, be given by a set or default interval in the first user equipment 121. In another example, the one or more intervals may be determined by the first user equipment 121 as described in Action 503. In a further example, the one or more intervals may be determined by the network node 110 as described in Action 501 and/or Action 502.

In some embodiments, the one or more intervals may comprise one or more periodic intervals. That is, for each interval, every n:th transmission burst is a transmission burst with the second energy level. Here, n may be e.g. n=2, 3, 4, 5, . . . , N, wherein N is any suitable integer. Thus, it may be noted that inherently any of these periodic intervals will produce a transmission burst sequence in which transmission bursts on a second energy level will recur less frequently over time in respect to the transmission bursts on a first energy level. One example of this is $T_{B2}$ in FIG. 3, wherein $T_{B2}=n*T_{B1}$.

In order to increase the energy of the transmission bursts at the one or more intervals to the second energy level, the energy of the transmission bursts may be increased by increasing the transmit power of the transmission bursts. This embodiment is shown in FIG. 3. Alternatively, the energy of the transmission bursts may be increased by increasing the duration of the transmission bursts. According to another alternative, both the transmit power and the duration of the transmission bursts may be increased. These alternatives may provide somewhat different properties to the beacon signal 140.

It should also be noted that increasing the transmit power of the transmission bursts at one or more intervals as discussed above may also comprise the case of lowering the transmit power of the other transmission bursts recurring in between the one or more intervals, i.e. the transmit power of the transmission bursts at one or more intervals is increased in relation to the transmit power of the other transmission bursts recurring in between the one or more intervals.

Furthermore, herein the term "interval" is intended to mean the period of time between two consecutive transmission bursts having an increased amount of energy, such as, e.g. $T_{B2}$ in FIG. 3.

Figure 6:
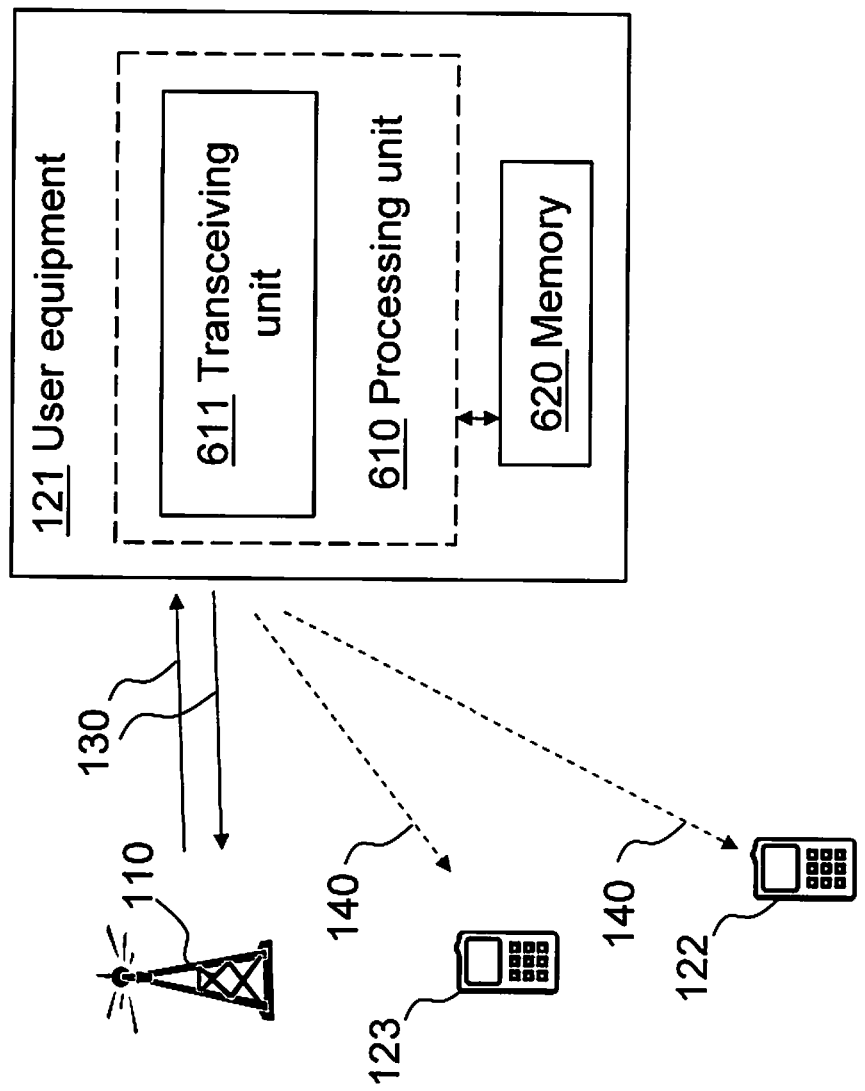
FIG. 6 is a block diagram depicting embodiments of a user equipment.

To perform the method actions for transmitting a beacon signal 140 to be detected by at least one second user equipment 122, 123 for D2D communication in a wireless telecommunications network 100, the first user equipment 121 may comprises the following arrangement depicted in FIG. 6. FIG. 6 shows a schematic block diagram of embodiments of the the first user equipment 121.

As mentioned above, the first user equipment 121 is configured to transmit the beacon signal 140 in transmission bursts with a first energy level, wherein the transmission bursts are transmitted continually over time in order to enable detection of the beacon signal 140 by the one or more second user equipment 122, 123.

The first user equipment 121 comprises a processing unit 610, which may also be referred to as processing circuitry. The processing unit 610 is configured to increase the energy of the transmission bursts at one or more intervals to a second energy level such that transmission bursts with the first energy level is alternated with transmission bursts with the second energy level, and such that transmission bursts with the first energy level recur more frequently over time than transmission bursts with a second energy level. The one or more intervals may comprise one or more periodic intervals. That is, for each interval, every n:th transmission burst is a transmission burst with the second energy level. Here, n may be e.g. n=2, 3, 4, 5, . . . , N, wherein N is any suitable integer.

The processing unit 610 may further comprise a transceiving unit 611. In some embodiments, the transceiving unit 611 is configured to transmit information to a network node 110 in the wireless telecommunications network 100 indicating that a D2D communication to the one or more second user equipments 122, 123 is requested, i.e. via ordinary cellular communication signaling 130. This may be performed e.g. when network assisted D2D communication is used. It should be note that the network node may also be a core network node connected to base station 110.

In some embodiments, the transceiving unit 611 is configured to receive information from the network node 110 indicating the one or more intervals at which the energy of the transmission bursts should be increased to the second energy level. This may be performed in response to the transmission of information to the network node 110, or on the initiative of the network node 110 on its own.

Furthermore, in some embodiments, the processing unit 610 may be configured to determine the one or more intervals at which the energy of the transmission bursts should be increased to the second energy level, based on the number of the one or more second user equipments 122, 123 that detects to the beacon signal of the first user equipment 121. In some embodiments, the processing unit 610 may also be configured to increase the transmit power of each transmission burst, and/or the duration of each transmission burst, in order to increase the energy of the transmission bursts at the one or more intervals to the second energy level.

The embodiments herein for transmitting a beacon signal 140 in the first user equipment 121 may be implemented through one or more processors, such as the processing unit 610 in the first user equipment 121 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the first user equipment 121. The computer program code may e.g. be provided as pure program code in the user equipment 121 or on a server and downloaded to the user equipment 121.

The first user equipment 121 may further comprise a memory 620 comprising one or more memory units. The memory 620 may be arranged to be used to store data, such as, e.g. information regarding the one or more intervals at which the energy of the transmission bursts should be increased to the second energy level, to perform the methods herein when being executed in the first user equipment 121.

Those skilled in the art will also appreciate that the processing unit 610 and the memory 620 described above may refer to a combination of analog and digital circuits, and/or one or more processors configured with software and/or firmware, e.g. stored in a memory, that when executed by the one or more processors such as the processing unit 610 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 7:
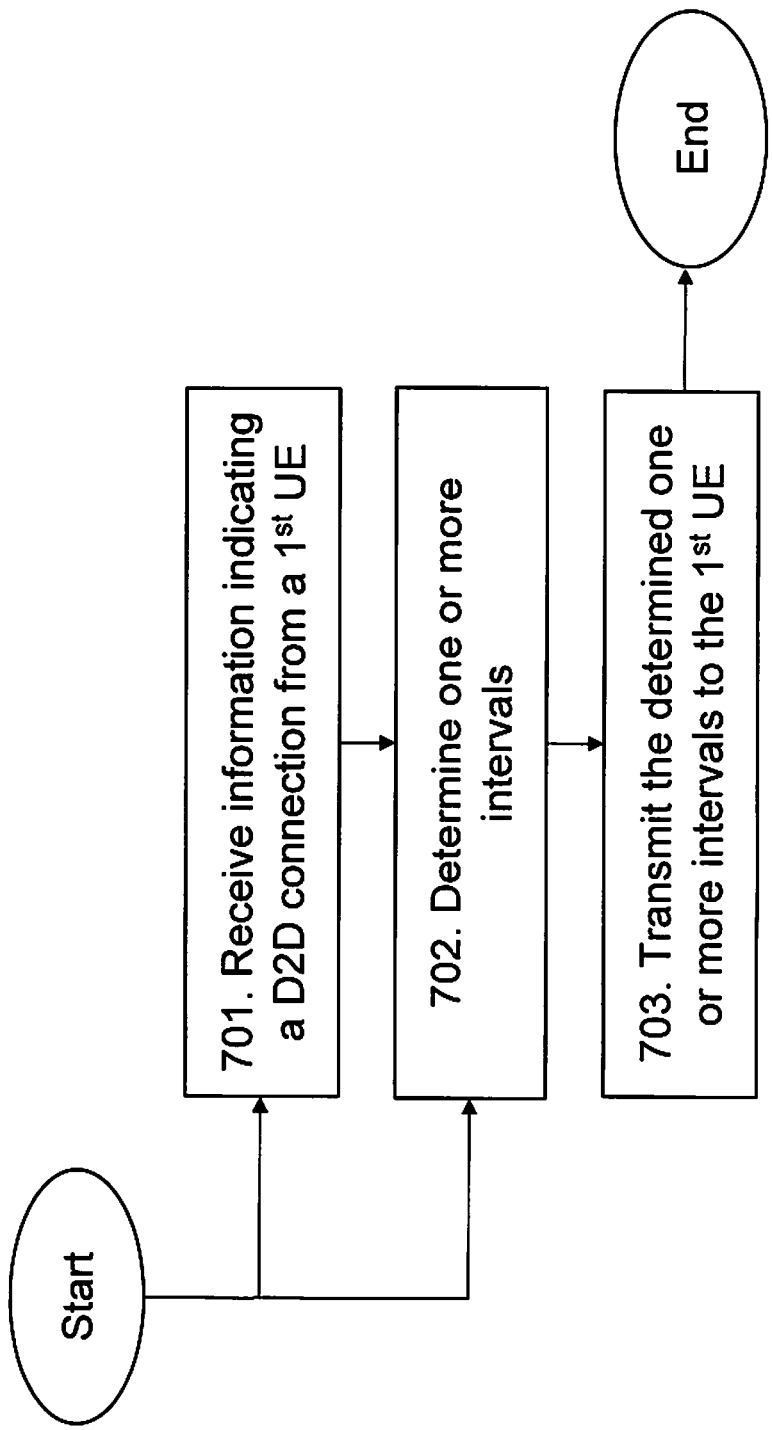
FIG. 7 is a flowchart depicting embodiments of a method in network node.

Example of embodiments of a method in network node 110 for configuring a beacon signal 140 in a first user equipment 121 for D2D communication in a wireless telecommunications network 100, will now be described with reference to a flowchart depicted in FIG. 7. Here, the method is discussed seen from the perspective of the network node 110. In an example scenario, the first user equipment 121 seeks or wishes to be discovered by a user equipment such as the second user equipment 122 for D2D communication. Therefore, the first user equipment 121 intend to send a beacon signal 140 that is to be discovered by the second user equipment 122 and assist the second user equipment 122 to find the first user equipment 121. As previously mentioned, this may be performed for a determined period of time, i.e. the beacon transmission comprises a starting point in time and an end point in time. This period of time for beacon transmission may be suitably configured in the first user equipment 121, e.g. determined in the first user equipment 121 or by the network node 110. The method may be performed for the entire duration of the beacon transmission or part(s) of the duration of the beacon transmission.

As mentioned above, the first user equipment 121 is configured to transmit a beacon signal 140 to be detected by at least one second user equipment 122, 123. The beacon signal 140 is transmitted in transmission bursts with a first energy level. The transmission bursts are transmitted continually over time in order to enable detection of the beacon signal 140 by the at least one second user equipment 122, 123.

The method comprises the following actions, which actions may be taken in any suitable order. It should also be noted that the method described below may also be performed partly or completely by a core network node (not shown) in the wireless communications network 100 to which the network node 110 may be configured to be connected.

Action 701

As in this case, when network assisted D2D device discovery is used, the network node 110 may receive information from the first user equipment 121 indicating that a D2D communication to one or more second user equipments 122, 123 is requested. Thus, the network node 110 may be informed that the first user equipment 121 desires to establish a D2D communication with one or more second user equipments 122, 123.

Action 702

In this action, the network node 110 determines one or more intervals at which the first user equipment 121 is to increase the energy of the transmission bursts to a second energy level. This is performed such that transmission bursts with the first energy level is alternated with transmission bursts with the second energy level. This is also performed such that transmission bursts with the first energy level recur more frequently over time than transmission bursts with a second energy level.

In some embodiments, the network node 110 may determine the one or more intervals based on the number of the one or more second user equipments 122, 123 presently located in the same cell 115 as the first user equipment 121, and/or in neighboring cells, in the wireless communications network 100. This may be performed because the significance of the amount of interference caused by the beacon signal 140 may depend on the number of the one or more second user equipments 122, 123 in the proximity of the first user equipment 121.

The one or more intervals may also, for example, be given by one or more set or determined intervals in the network node 110.

In this way, the network node 110 may inform the first user equipment 121 of suitable one or more intervals at which the energy of the transmission bursts of the beacon signal 140 should be increased to the second energy level.

Additionally, in some embodiments, the network node 110 may determine how the energy should be increased by the first user equipment 121 at the one or more intervals, e.g. in the form of an energy level, power level and/or burst duration. In some embodiments, the network node 110 may also determine inform a period of time for the duration of the beacon transmission of the first user equipment 121.

Action 703

After determining the one or more intervals, the network node 110 may transmit information to the first user equipment 121 for D2D communication. The information indicating the determined one or more intervals at which the energy of the transmission bursts should be increased to the second energy level.

In this way, the network node 110 may inform the first user equipment 121 of suitable one or more intervals at which the energy of the transmission bursts of the beacon signal 140 should be increased to the second energy level. Thus, the network node 110 configures the beacon signal in the first user equipment for D2D communication.

In some embodiments, the network node 110 may also inform the first user equipment 121 about how the energy should be increased by the first user equipment 121 at the one or more intervals, e.g. in the form of an energy level, power level and/or burst duration. In some embodiments, the network node 110 may also inform the first user equipment 121 about a period of time for the duration of the beacon transmission.

To perform the method actions for configuring a beacon signal 140 in a first user equipment 121 for D2D communication in a wireless telecommunications network 100, the network node 110 may comprises the following arrangement depicted in FIG. 6. FIG. 6 shows a schematic block diagram of embodiments of the network node 110.

As mentioned above, the first user equipment 121 is configured to transmit a beacon signal 140 to be detected by at least one second user equipment 122, 123. The first user equipment 121 is configured to transmit the beacon signal 140 in transmission bursts with a first energy level, wherein the transmission bursts are transmitted continually over time in order to enable detection of the beacon signal 140 by the one or more second user equipment 122, 123.

The network node 110 comprises a processing unit 810, which may also be referred to as processing circuitry. The processing unit 810 in the network node 110 may comprise, or be configured to be connected to, a transceiving unit 811 and a determining unit 812.

The transceiving unit 811 is configured to transmit information to the first user equipment 121; the information comprising an indication of the determined one or more intervals at which the energy of the transmission bursts should be increased to the second energy level. Additionally, the information may comprise information about how the energy should be increased by the first user equipment 121 at the one or more intervals, e.g. in the form of an energy level, power level and/or burst duration, and/or a period of time for the duration of the beacon transmission. The transceiving unit 811 is further configured to receive information from the first user equipment 121 indicating that a D2D communication to the at least one second user equipment 122, 123 is requested.

The determining unit 812 is configured to determine one or more intervals at which the first user equipment 121 is to increase the energy of the transmission bursts to a second energy level such that transmission bursts with the first energy level is alternated with transmission bursts with the second energy level, and such that transmission bursts with the first energy level recur more frequently over time than transmission bursts with a second energy level. The determining unit 812 may also be configured to determine how the energy should be increased by the first user equipment 121 at the one or more intervals, e.g. in the form of an energy level, power level and/or burst duration, and/or a period of time for the duration of the beacon transmission of the first user equipment 121.

In some embodiments, the determining unit 812 is further configured to determine the one or more intervals based on the number of the at least one second user equipment(s) 122, 123 presently located in the same cell 115 as the first user equipment 121, and/or in neighboring cells, in the wireless communications network 100.

Figure 8:
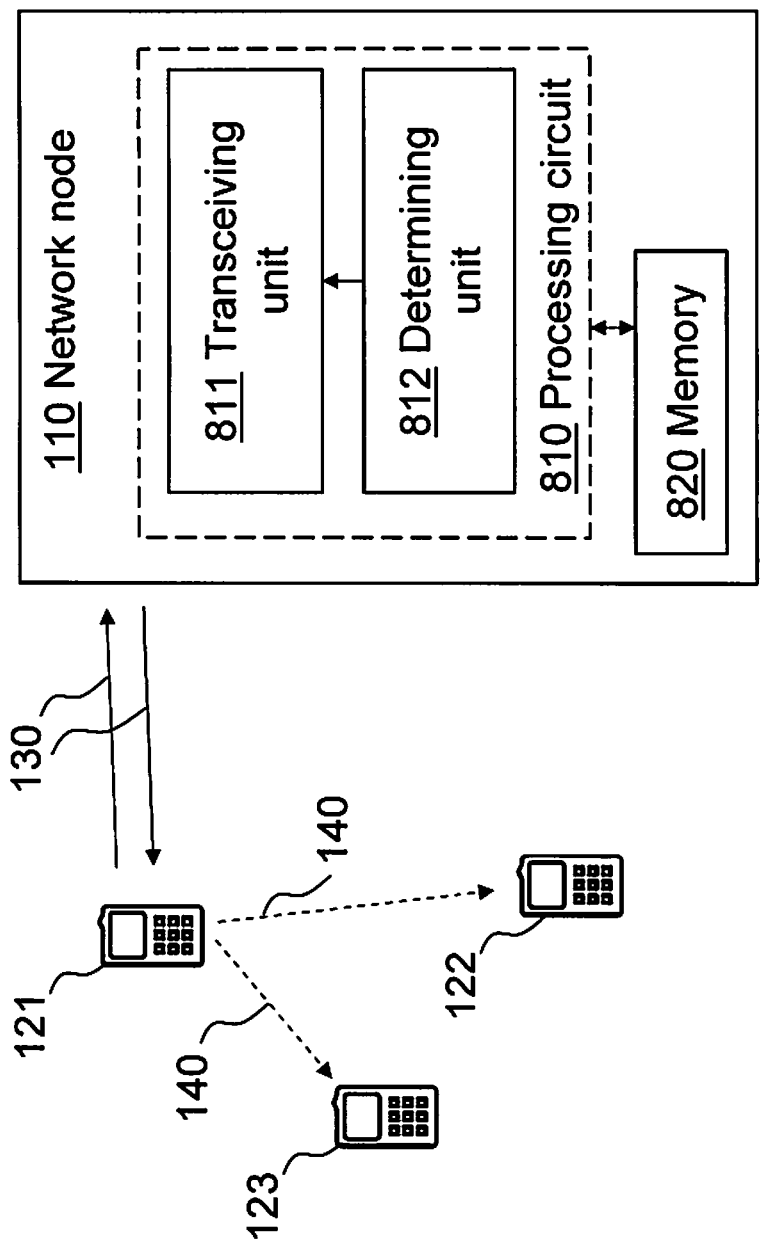
FIG. 8 is a block diagram depicting embodiments of a network node.

The embodiments herein for enabling a D2D communication between a first user equipment 121 and at least one second user equipment 122, 123 may be implemented through one or more processors, such as the processing unit 810 in the network node 110 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may e.g. be provided as pure program code in the network node 110 or on a server and downloaded to the network node 110.

The network node 110 may further comprise a memory 820 comprising one or more memory units. The memory 820 may be arranged to be used to store data, such as, e.g. information regarding the one or more intervals at which the energy of the transmission bursts should be increased to the second energy level, to perform the methods herein when being executed in the network node 110.

Those skilled in the art will also appreciate that the processing unit 810 and the memory 320 described above may refer to a combination of analog and digital circuits, and/or one or more processors configured with software and/or firmware, e.g. stored in a memory, that when executed by the one or more processors such as the processing unit 810 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The embodiments herein are not limited to the above described preferred embodiments. Various alternatives, modifications and equivalents may be used. Therefore, the above embodiments should not be construed as limiting.

The invention claimed is:

1. A method in a first user equipment for transmitting a beacon signal to be detected by at least one second user equipment for Device-to-Device, D2D, communication in a wireless telecommunications network, said method comprising:
    transmitting the beacon signal in transmission bursts with at a first energy level or at a second energy level,
    wherein the transmission bursts are transmitted over time for detection of the beacon signal by the at least one second user equipment,
    wherein the beacon signal is transmitted for one or more time intervals at the first energy level and for one or more time intervals at the second energy level such that the transmission bursts wife at the first energy level are interspersed with transmission bursts wife at the second energy level, and wherein the transmission bursts wife at the first energy level recur more frequently than the transmission bursts wife at the second energy level,
    wherein the one or more time intervals comprise one or more periodic time intervals such that, for each periodic time interval, every n:th transmission burst is a transmission burst wife at the second energy level, wherein n is a positive integer greater than one.

2. The method according to claim 1, further comprising:
    transmitting information to a network node in the wireless telecommunications network indicating that a D2D communication to the at least one second user equipment is requested, and/or
    receiving information from the network node indicating the one or more tin intervals at which energy of the transmission bursts is at the second energy level.

3. The method according to claim 1, further comprising:
    determining the one or more time intervals at which energy of the transmission bursts is at the second energy level, based on a number of the at least one second user equipment detecting the beacon signal from the first user equipment.

4. The method according to claim 1, wherein transmission bursts at the second energy level have greater transmit power and/or greater duration than the transmission bursts at the first energy level.

5. The method according to claim 1, wherein consecutive ones of the transmission bursts are equally spaced in time.

6. The method according to claim 1, wherein one transmission burst is transmitted in each time interval,
    wherein the beacon signal is transmitted for two or more time intervals at the first energy level immediately after the beacon signal is transmitted at the second energy level for one time interval, and
    wherein the beacon signal is transmitted for two or more time intervals at the first energy level immediately before the beacon signal is transmitted at the second energy level for the one time interval.

7. The method according to claim 1, wherein a first one of the transmission bursts at the second energy level is immediately preceded by a second one of the transmission bursts at the first energy level and is immediately succeeded by a third one of the transmission bursts at the first energy level.

8. A first user equipment for transmitting a beacon signal to at least one second user equipment for Device-to-Device, D2D, communication in a wireless telecommunications network, said first user equipment comprising:
a transmitter configured to transmit the beacon signal in transmission bursts at a first energy level or at a second energy level, wherein the transmission bursts are transmitted over time for detection of the beacon signal by the at least one second user equipment; and
a processor configured to control the transmitter,
wherein the processor controls the transmitter to transmit the beacon signal for one or more time intervals at the first energy level and for one or more time intervals at the second energy level such that transmission bursts at the first energy level is interspersed with transmission bursts at the second energy level, and
wherein the transmission bursts at the first energy level recur more frequently than transmission bursts wife at the second energy level,
wherein the one or more time intervals comprise one or more periodic time intervals such that, for each periodic time interval, every n:th transmission burst is a transmission burst wife at the second energy level, wherein n is a positive integer greater than one.

9. The user equipment according to claim 8,
wherein the transmitter is further configured to transmit information to a network node in the wireless telecommunications network indicating that a D2D communication to the at least one second user equipment is requested, and/or
wherein the user equipment further comprises a receiver configured to receive information from the network node indicating the one or more time intervals at which energy of the transmission bursts should be increased to the second energy level.

10. The user equipment according to claim 8, wherein the processor is further configured to determine the one or more time intervals at which the transmission bursts are to be transmitted at the second energy level, based on a number of the at least one second user equipment detecting the beacon signal from the first user equipment.

11. The user equipment according to claim 8, wherein the second energy level has greater transmit power of the transmission burst and/or greater duration of the transmission burst, than the first energy level.

12. A method in a network node for configuring a beacon signal in a first user equipment for Device-to-Device, D2D, communication in a wireless telecommunications network,
wherein the first user equipment is configured to transmit the beacon signal to at least one second user equipment, wherein the beacon signal is transmitted in transmission bursts with at a first energy level or at a second energy level, wherein the transmission bursts are transmitted over time for detection of the beacon signal by the at least one second user equipment, the method in the network node comprising:
determining one or more time intervals at which the first user equipment is to transmit one or more of the transmission bursts at the second energy level such that transmission bursts with the first energy level is interspersed with transmission bursts with at the second energy level, and such that transmission bursts with at the first energy level recur more frequently over time than transmission bursts with at the second energy level, and
sending information to the first user equipment indicating the one or more time intervals at which the one or more of the transmission bursts are transmitted at the second energy level,
wherein the one or more time intervals are determined based on the a number of the at least one second user equipment presently located in the same cell as the first user equipment, and/or in neighboring cells, in the wireless communications network.

13. The method according to claim 12, further comprising:
receiving information from the first user equipment indicating that a D2D communication to the at least one second user equipment is requested.

14. A network node for configuring a beacon signal in a first user equipment for Device-to-Device, D2D, communication in a wireless telecommunications network, wherein the first user equipment is configured to transmit the beacon signal to at least one second user equipment, wherein the beacon signal is transmitted in transmission bursts wife at a first energy level or at a second energy level, wherein the transmission bursts are transmitted over time for detection of the beacon signal by the at least one second user equipment, the network node comprising:
a processor configured to determine one or more time intervals at which the first user equipment transmits the transmission bursts at a second energy level such that transmission bursts wife at the first energy level is interspersed with transmission bursts wife at the second energy level, and such that transmission bursts at the first energy level recur more frequently over time than transmission bursts with at the second energy level, and
a transceiver configured to transmit information to the first user equipment indicating the one or more time intervals at which the transmission bursts are to be transmitted at the second energy level,
wherein the one or more time intervals are determined based on a number of the at least one second user equipment presently located in the same cell as the first user equipment, and/or in neighboring cells, in the wireless communications network.

15. The network node according to claim 14, wherein the transceiver is further configured to receive information from the first user equipment indicating that a D2D communication to the at least one second user equipment is requested.

* * * * *